3,535,797
TEACHING MACHINE FILM
John C. L. Leslie and Burton E. Dieruf, Albuquerque, N. Mex., assignors, by mesne assignments, to Robert Lloyd Leslie
Original application Mar. 15, 1966, Ser. No. 534,369, now Patent No. 3,395,464, dated Aug. 6, 1968. Divided and this application July 17, 1968, Ser. No. 764,355
Int. Cl. G09b 7/08
U.S. Cl. 35—9     5 Claims

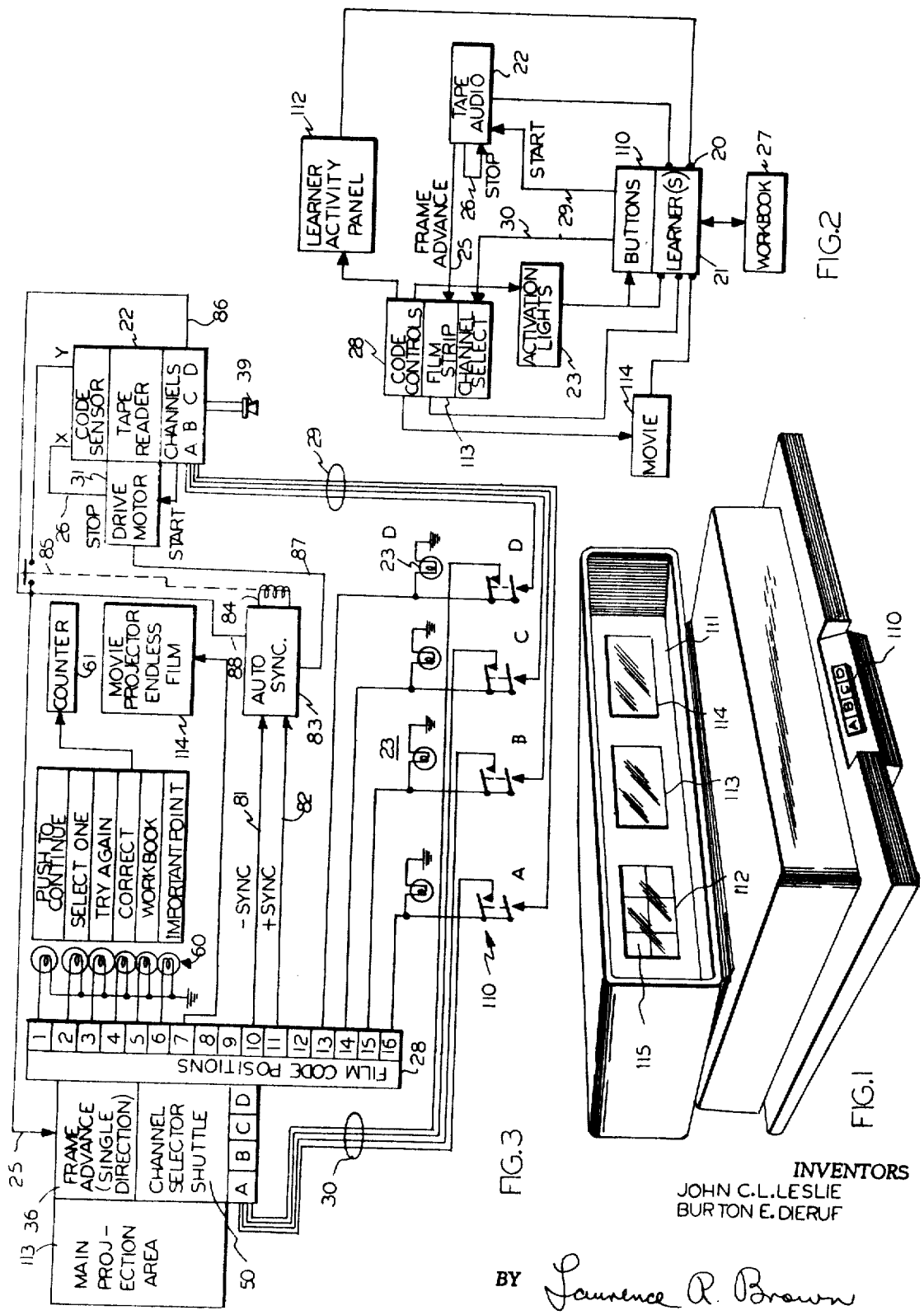

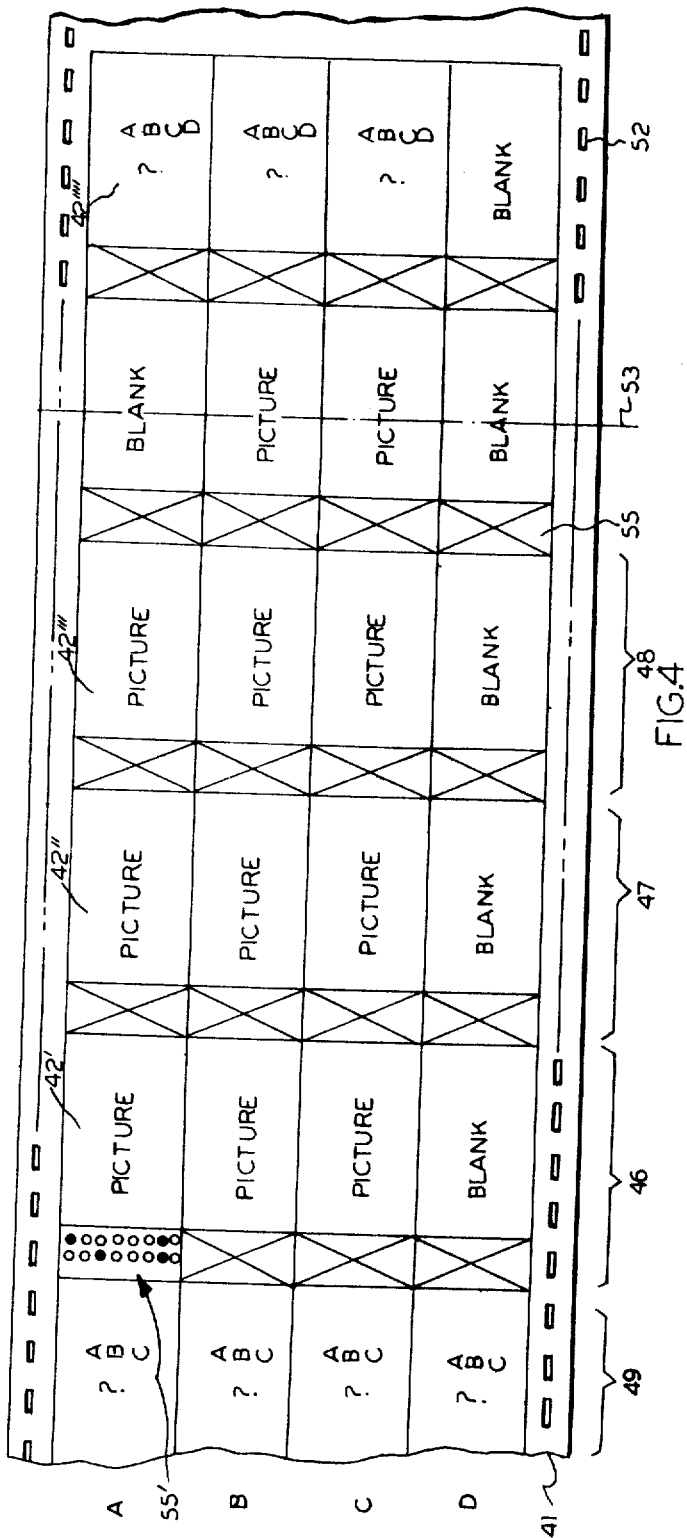
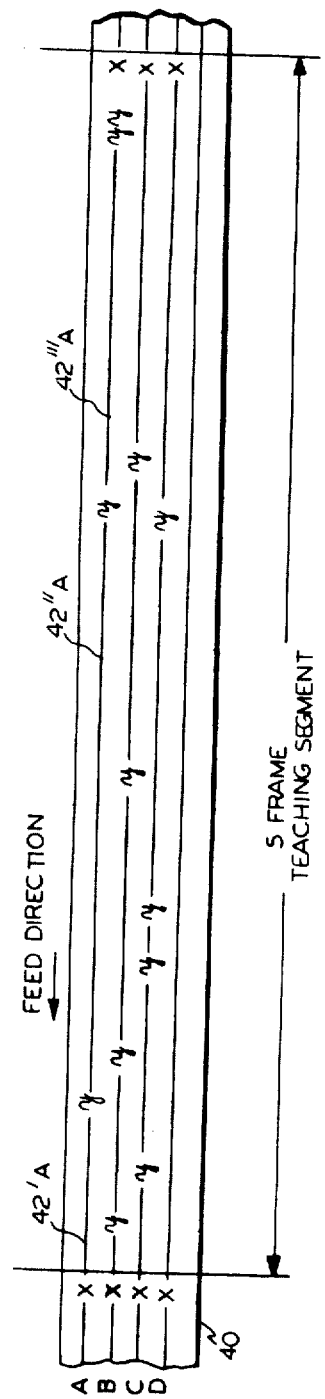
FIG.4

ABSTRACT OF THE DISCLOSURE

A film strip for an educational teaching machine is provided with a plurality of side by side picture channels disposed longitudinally along the film. Each channel is divided into a plurality of sequential frames grouped into teaching segments with each frame having a picture area and a control signal area therein.

CROSS REFERENCE TO RELATED APPLICATIONS

This application is a division of application Ser. No. 534, 369, filed Mar. 15, 1966, which is now U.S. Pat. No. 3,395,464, issued Aug. 6, 1968.

This inventon relates to teaching aids for presenting programmed instruction materials and more particularly, it relates to improved teaching machine systems and controls incorporated therein.

In order to provide a comprehensive teaching machine capability it has been found desirable to provide various basic functional or performance features including those which make the machine:

(1) Useful for both individual and group instruction at a paced speed dependent upon the retention of a specified amount of information from the instruction materials presented.

(2) Adaptable to present program content in units or steps of various lengths and program content.

(3) Provide for student participation in the program in response to preselected queries.

(4) Indicate to the student correctness of response with possible storage of this information for automatic grading or statistical surveys.

(5) Produce immediate logical feedback in sequence of comments concerning the student response to reinforce the learning procedure either by reviewing pertinent features where the understanding level is deficient or by presenting advanced or supplemental information where the student comprehends the instruction materials that have been presented.

(6) Present a prepared comprehensive multiple level program in a continuous logical sequence which does not detract from the learning process by requiring the learner to manipulate complex controls or to stop to think about machine operation rather than the presented instructional program.

(7) Develop a step by step presentation of predetermined size instruction increments in a diversified manner in several different communication media.

(8) Employ branching techniques under control of the student to permit individual progress of students of widely varied backgrounds and learning capacities at an optimum pace through a choice of several varied instructional programs.

(9) With availability of a variety of presentation techniques for presentation of different instruction materials in various combinations of oral and visual moving or stationary form supplemented by commands, hints, emphasis, pauses, practice, and other controls of learner activity.

It is therefore a general object of this invention to provide a simple teaching machine system incorporating the above described desiderata.

In achieving this it is another object of this invention to provide improved apparatus for presenting programmed instruction materials and control systems for use therewith which simplify the requisite apparatus while retaining or improving the capability of effectively teaching various individuals with standard programmed instruction sequences.

A more specific object of the invention is to provide teaching machine techniques which enhance the learning process without requiring complex equipment.

These and further features, objects, and advantages are realized in accordance with this invention in a teaching system which presents sequentially programmed information from either or both a film and an audio record under control of a learner whose only access to the program is limited to a set of multiple choice channel selection keys which are activated only as an integral part of the instruction program when learner response to a teaching segment of the instructional program is desirable. A multiple channel program is presented on both the unidirectional audio record sequentially presenting teaching segments in a logical order and the corresponding set of film frames, from which the learner selects corresponding channels at designated response points in the program under control of manually operated keys. Thus, one of four channels on the film and audio record is chosen by a corresponding key or button, and the program sequence follows while film and audio tape is advanced in a single direction by jumping from channel to channel at the response points to provide a large number of different individual routes in the programmed instruction materials varied by background retention differences between individual learners and subject to the amount of the instruction program he has grasped during the preceding presentation sequences. Thus the learner is an integral element in the routing process through the sequential unidirectionally presented sets of incremental programmed instruction material steps.

Provisions are made to present the materials not only from basic visual text materials in film form as supplemented by motion pictures and accompanying audio text, but also with supplementary teaching aids in the form of auxiliary visually observable written instructions programmed along with the basic text materials. Each film frame carrying text materials thus carries a plurality of coded control signals to supplement the learning process with supplemental instructions. These control signals also direct the internal machine operation process to operate the system in various automatic sequences without intervention by the learner.

This apparatus including its controls and corresponding teaching methods will be found described in more detail in the following specification with reference to the accompanying drawings, wherein:

FIG. 1 is a perspective view of a teaching machine afforded by this invention showing the operator control panel and visual viewing panel.

FIG. 2 is a functional block diagram showing general system organization and communication channels.

FIG. 3 is a block diagram of a preferred apparatus embodiment of the invention with corresponding control channels, and FIG. 4 is a diagrammatic view of related audio and visual channel layout within a typical teaching program segment.

A teaching machine configuration is shown in FIG. 1 as provided by this invention with sole operational access to the machine by the learner in the form of a set of four keys 110 which serve to select one of the designated four channels A, B, C, and D, of programmed instructional materials. Each key 110 is activated for this choice by an internal program only at a response point appearing at the end of a teaching program step or segment of predetermined length and program content. At the time of key activation a lamp is lit beneath the key to indicate those channels affording a meaningful choice so that the learner activity in running the machine is limited to solely a choice of several operative channels. In this way the learner becomes an integral part of the programmed path through the four channels without detraction from the instruction program in operation of complex machine controls, since the selection feature itself is a programmed instructional step in the form of a query to the student which require a multiple choice answer.

Instructional materials are presented visually by projection upon screen 111 in three separate adjacent viewing sections 112, 113, and 114. The main central viewing section 113 provides for presentation of series of still film frames from a 35 millimeter projector in sequence with a step by step development of an instructional program. Auxiliary screen section 114 permits introduction into the program sequence moving pictures from a programmable eight millimeter movie projector. The further screen section 112 is designated a "learners activity panel" and provides for visual presentation of written instructions selected during the instructional program to supplement the materials presented from the still or movie films. Thus, such legends as "Push To Continue"; "Select One"; "Try Again"; "Important Point"; "Correct Answer"; and "Workbook" may be presented upon command in the sub-areas 115 of section 112.

Accordingly, the teaching apparatus afforded by this invention provides for auxiliary visual signals supplementing instructional materials on the main program channels which can take the form of either the auxiliary written legends on the learner activity panel 112 or the lights identifying the activated keys 110.

System organization generally takes the form indicated by the block diagram of FIG. 2. It will be made evident throughout the specification that the multiple-channel selection feature afforded by buttons or control keys 110 not only provides for better teaching facilities without interrupting the train of thought of the learner in manipulating machines such as would be required in the reversal of the film feed direction or the search for an address in a random access storage system, but in addition, serves to significantly simplify machine and system configurations and controls to permit a simplified and yet comprehensive teaching machine configuration.

As seen from the circles 20 at the learner box 21 intelligence in five different communication channels is received. The term learner can include an averaging or consensus of several persons if desired so that the machine is gaged to the needs of a class as a special "individual" by selecting buttons 110 on the basis of class vote, for example.

A single channel of audio communication to the learner 21 comes from a magnetic tape audio record section 22 for example, while visual information comes in four different channels e.g., the learner activity panel 112, the movie system 114, the film strip screen 113, and button activation lights 23.

In operation, the system remains under basic control of the audio tape unit 22, which is started in a selected one of multiple channels by the corresponding button choice 110 made by the learner 21. In this selected channel the voice is synchronized with the visual communications by providing advance signals along lead 25 to the film strip processing unit until the end of a teaching segment is reached at which time the entire system stops, by means of a signal on the audio record processed along lead 26, to await a further learner selection of one of the buttons 110.

As the machine is stopped the learner may even practice or take notes in his workbook 27, at a point in the program prescribed by the notation "workbook" on the learner activity panel 112. In most instances, however, the stop will indicate a response point on the film strip at which position a multiple choice query will appear at film strip screen 113 to determine the student's grasp of materials in the preceding programmed instruction step or steps. Thus, the subsequent multiple program channels may be used in the next program segment to either review pertinent data with an explanation depending upon which wrong choice was made, or to supplement the program with advanced subject matter if a correct answer was made by merely placing different programmed materials in the different channels which maintain a logical sequence in the program or lesson without reversing the record or film or requiring random access look up, or employing extensive automatic search controls in the machine for this purpose.

An auxiliary set of control code signals 1 to 16 in section 28 is placed upon each film frame to accomplish various functions as to control appropriate notation on the learner's activity panel 112, to introduce a moving picture 114 into the sequence and to activate the buttons 110 and appropriate channel lights 23 at response or query frames.

The film strip itself has a plurality of channels as well as the tape so that by means of control cables 29 and 30, corresponding channels in both the audio and visual program are designated by buttons 110.

The simplified control system organization of this invention may be observed from consideration of FIG. 3. Each of the blocks is used to identify equipment well known in the present status of the art which can be incorporated into the system with minor variations fully explained hereinafter. For example, magnetic tape reader 22 may comprise any conventional four channel (A, B, C, D) reader having a drive motor 31 which can be started and stopped. The tape is stopped by signal commands read from the tape through leads 26, and is started from selection of any of the four channels under control of signals at cable 29. Audio reproduction from tape reader 22 is made by means of speaker 39.

In order to provide controls for advancing frames in the film projector 36 along lead 25, the tape reader incorporates signal detectors for coded tones or conductive segments of two different distinguishable types X and Y in each channel. Thus, the tape reader 22 can stop itself at the end of a programmed teaching segment by detecting signal X serving to stop the drive motor 31 via lead 26. The magnetic audio tape format is shown schematically in FIG. 4 wherein each channel A, B, C, D on tape 40 may have a distinctive program with different length audio messages between each y signal in the various channels as disposed along the teaching segment which is one of a plurality appearing along the tape to present a set of program steps in logical sequence.

A corresponding visual teaching segment of five frames on the film strip 41 is shown for comparison. The teaching segment can comprise more or less than the exemplified five frames to give complete flexibility in preparing programs of instructional matrials to suit the needs of any student or field of instruction, and the content contained in each frame or teaching step is limited only by the amount of material optically feasible within the aspect ratio of each rectangular picture area 42.

As may be seen from the signals y diagrammatically shown on the magnetic tape 40 in each audio channel A, B, and C, the instruction content or length of step in the various audio channels can be varied to correspond with the content of specific pictures 42 on the film strip in corresponding channels. That is, in channel A perhaps only three frames 42', 42", and 42'" have instruction materials which need audio comment. Frame 42' is automatically advanced into viewing position on the optical screen 113 when the film channel A is selected by an appropriate pushbutton 110. Then, audio section 42" A and 42'"A (between y signals) are synchronized with movement of frames 47–48 into view. The further two frames may then be fast-advanced at the end of the audio teaching segment by the two grouped y signals before the film tape is halted at the end of the teaching segment marked by an x stop signal, leaving query or response frame 42'''' (noted by a ? symbol) in view until a further push button control key 110 is actuated by the learner in response to a choice A, B, C, or D visually described in the response picture 42''''.

However, in other audio channels B and C picture content may occur in all five picture frames requiring differing audio comment. Thus, audio records of different length are shown in sequence between the film advance positions y. Less than the four channels may be used in some segments of a complete program unit or lesson, such as when the previously presented response frame 49 only gives three options A, B, C, for a choice by the learner, and thus only channels A, B, and C in the audio tape 40 and film strip 41 are shown as being programmed for the illustrated teaching segment. The next sequential teaching segment along the tape 40 and film strip 41 may, for example, have eight frames in all four channels, the latter being indicated by learner choices A, B, C, and D suggested in query frames 42''''.

The film may be advanced in a conventional 35 millimeter film strip projector unit 36 which is programmed to advance one frame at a time in response to a signal at lead 25. In accordance with this invention; however, the projector is modified in two respects, the first of which is incorporation of a multiple channel selector shuttle unit 50 such as described in the commonly assigned copending application, Ser. No. 383,070 for Teaching Machine, filed July 16, 1964, or an equivalent unit permitting only one of four pictures in each frame to be projected. Thus, closing of one of the control keys 110 serves via cable 30 to select only one of the film channels A, B, C, or D for viewing on screen 113.

The other modification comprises changing the sprocket drive assembly to feed the special sprocketed holes 52 of film strip 41 which vary from the standard sprocket holes for 35 mm. film in having five equally spaced holes per frame placed closer to the edge of the film strip similar to standards for eight millimeter film to permit more room in accommodating the four channels across the film. The film and projector thus are adapted by the viewing shuttle to project the film pictures 42 with their rectangular aspect ratio oriented on an axis 53 normal to the film strip rather than in the conventional manner with the axis along the length of the film as in standard 35 mm. film projectors. Thus, the pictures 42 are projected on the screen 113 oriented on an axis normal to the film strip so that the projected picture may be read as the legends placed in the picture areas 42.

Each picture area 42 in each frame 46, 47, etc. (which is in turn divided into four side by side picture channels) bears a control section 55 between each two adjacent frames, which has a plurality such as a group of sixteen binary code positions (typically shown at 55') serving to control the internal operation of the machine relative to the predetermined instruction materials placed in the program. These code areas are individually detected within the control signal groups by a set of photocells from a masked (unseen) area of the projection screen 113, for example, and in amplified form serve in film code detector section 28 to provide a plurality of control channels, selectably operable in any combination as part of the instruction program when prepared with the picture to contain light and dark code positions as shown in code position 55'. This comprises a significant part of the educational content of the program but serves also to considerably simplify the control equipment necessary to make the present system fully automatic except for operator intervention at control keys 110.

In this automatic operation, for example, code positions 13–16 may be used as the sole control signals for activating respective keys 110A, 110B, 110C, or 110D, along with the auxiliary visual operator information afforded by lighting corresponding lamps 23A, 23B, 23C, or 23D. Thus, these coded spots for channels 13–16 normally would be recorded only in the query frame pictures 42'''', unless it is desired to activate a channel change possibility in a position intermediate along the teaching segment for some reason.

However, other code positions such as 1–6 could be used in a picture in any frame to supplement the text material in the picture with automatic control functions, written commands or emphasis, as indicated by lighting one of more lamps 60 to display corresponding legends (hidden from view and not projected on screen area 115 in their darkened position) on the learner activity panel 112.

A further correct answer counter 61 could be controlled directly from the "correct" answer legend displayed when a proper channel A, B, C, or D is chosen after a query frame 42''''. This can supply grading information or statistical data for review.

Another auxiliary control code may be used as in code position 7 for displaying movies from projector 114 in sequence with the text materials in the picture frames 42, etc. In the simplest case this control code 7 serves to turn on a projection lamp and drive motor for an eight millimeter projector having an endless film section with a stop signal recorded at the splice to turn off the projector after a completed move projection cycle. It is evident that motion will add a further teaching dimension aiding the education process and that color films may be used for further depth of instruction materials.

Also, the system is automatically synchronized by means of coded spots 10 and 11 on the film for two different actions designated at −sync and +sync leads 81, 82 leading into the synchronizing device 83.

The function of the "minus sync" at coded spot 10 is to prevent the film frames from getting ahead of the recorded audio segments, such as might occur when a false film advance signal is generated by a transient on the power line or a defect in the audio tape, etc. Thus, the film code at position 10 is dark except at response points where it is clear and thus actuates a photocell signal to the sync circuit 83 operating relay 84 to open contacts 85 in the automatic frame advance line 25 as operated by y signals on the audio tape. Thus, as the film has gotten ahead of the tape, the film is not advanced until the response point is reached and a button A, B, C, or D is pushed to advance the film into the next frame by way of lead 86.

Conversely the function of the "plus sync" is to prevent the film from lagging behind the audio messages should an advance signal y be missed. If this happened, the film would be at an intermediate instructional frame when the audio stops and no light would be energized for control of buttons A, B, C, or D operated only at response points. Any departure from thinking only of the educational features, by requiring machine adjustment by the learner would be inconsistent with the objectives of this machine. Accordingly, the plus sync signal at lead 82 derived from film code 11 will automatically advance the film to the next response point. For this reason, the code spot is clear on each frame and dark at the response frame. This signal is energized in sync circuit 83 only when the drive motor is stopped by way of lead 87 and then operates to advance the film one frame at a time for each clear code spot 11 until the response frame is reached as indicated by lead 88.

Accordingly, completely automatic synchronization is simply provided without any thought or action necessary by the student.

Having therefore described the teaching machine organization and control as provided by this invention to improve teaching methods by making comprehensive programs attainable in simplified and fully automatic equipment, we define the novel aspects believed descrip-

What is claimed is:

1. An instructional film for display on a visual teaching machine comprising in combination an elongated film having a plurality of side by side picture channels with said channels being disposed longitudinally along said film, each of said channels being divided into a plurality of sequential frames with said frames being grouped into a plurality of sequential teaching segments, each having a selected number of frames, each of said frames including a picture area and an area having control signals recorded therein.

2. An instructional film as set forth in claim 1, wherein said control signals are comprised of binary coded control signal groups.

3. An instructional film as set forth in claim 1 wherein the film width is 35 mm. and 5 equally spaced sprocket holes are disposed in each edge of the film alongside each frame.

4. An instructional film as set forth in claim 1, wherein each series of frames in a teaching segment each comprise an educational sequence of pictures to provide educational branching by shifting from the educational picture sequence on one of said film channels to a different educational sequence logically related to that on said one of said film channels continuing along the length of film on another of said film channels.

5. An instructional film as set forth in claim 1 wherein said coded signals identify auxiliary instructions relating to the program materials and synchronization patterns for auxiliary equipment such as audio recorders.

References Cited

UNITED STATES PATENTS

| | | | |
|---|---|---|---|
| 1,262,954 | 4/1918 | Ives | 352—83 |
| 3,273,260 | 9/1966 | Walker | 35—9 |
| 3,344,534 | 10/1967 | Anschutz et al. | 35—9 |

WILLIAM H. GRIEB, Primary Examiner